United States Patent Office 3,253,472
Patented May 31, 1966

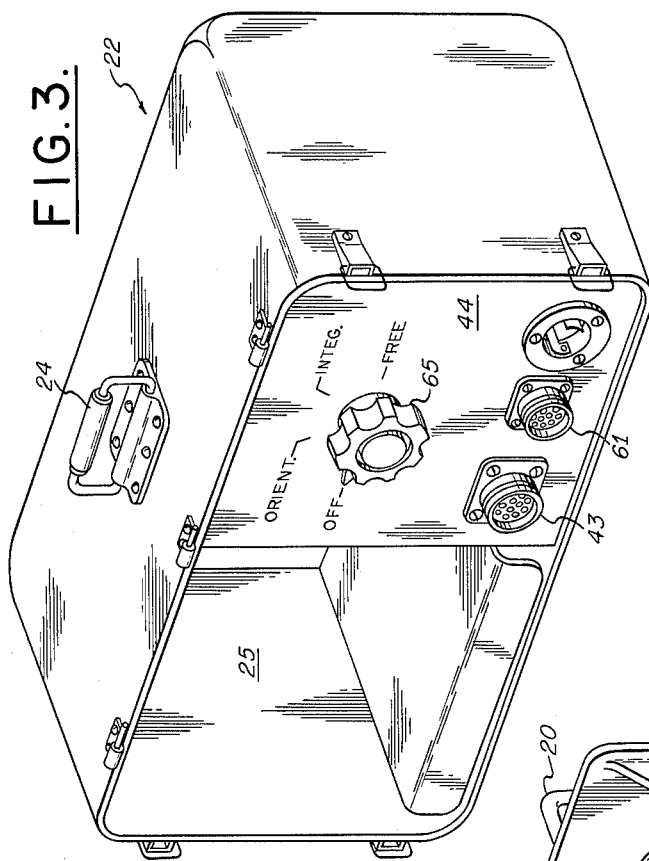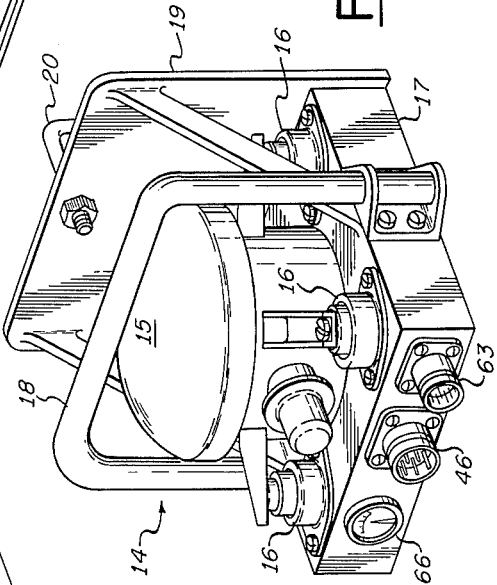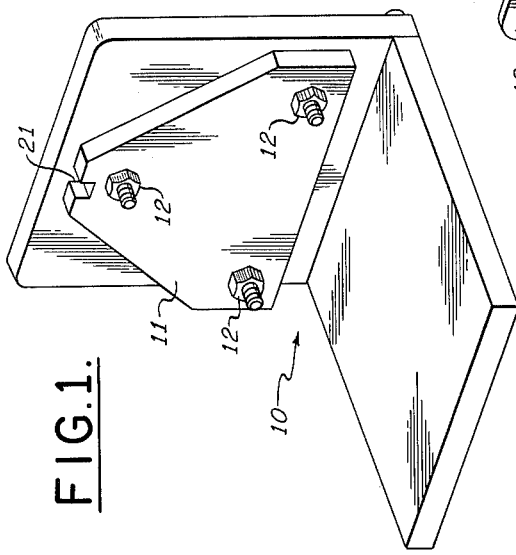

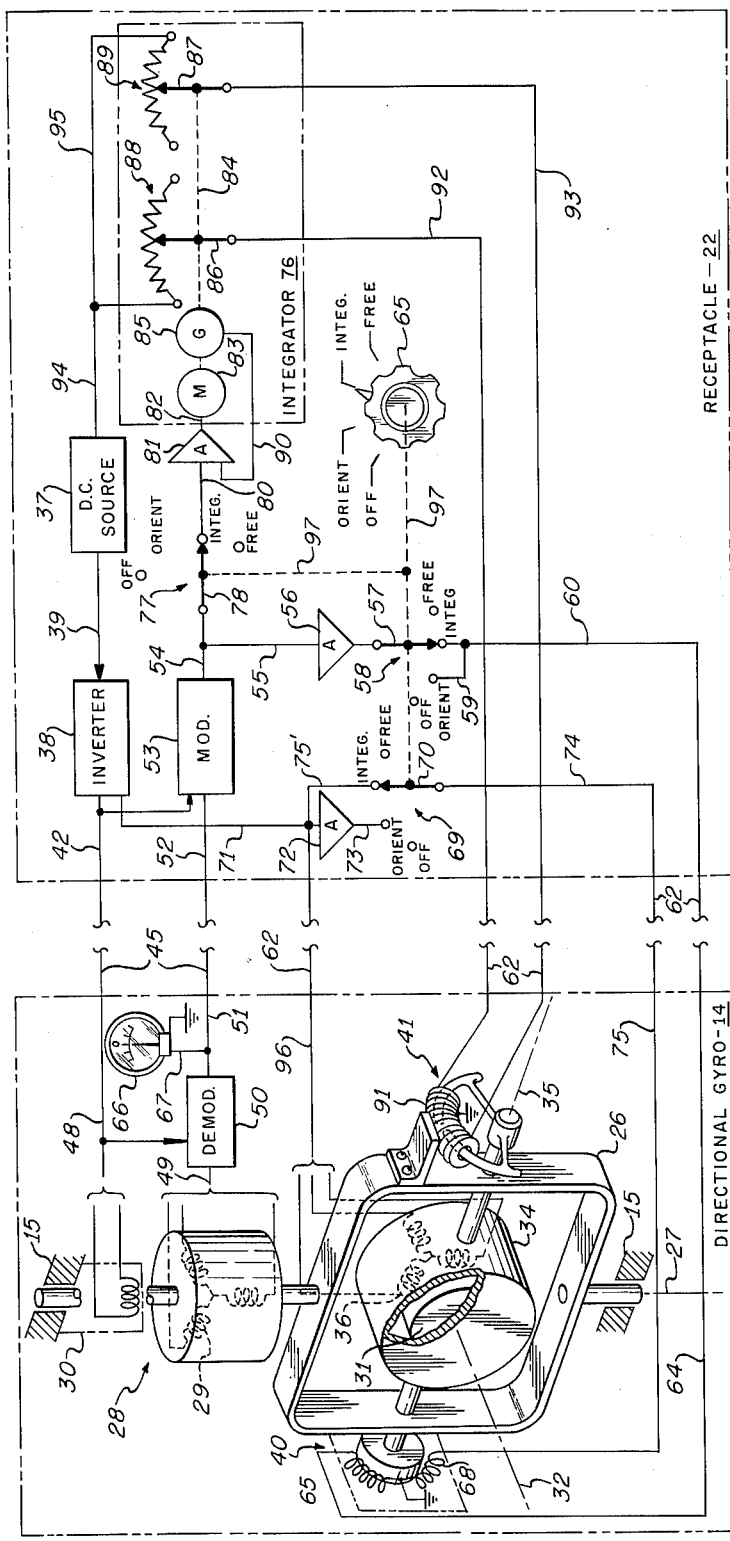

3,253,472
TRANSPORTABLE GYROSCOPIC AND POWER EQUIPMENT
Martin S. Klemes, East Meadow, N.Y., assignor to Sperry Rand Corporation, Great Neck, N.Y., a corporation of Delaware
Filed Mar. 28, 1963, Ser. No. 268,662
3 Claims. (Cl. 74—5.4)

This invention relates to transportable gyroscopic and power equipment for providing an initial aligning output for a compatible heading system in a dirigible craft. The improved equipment makes it unnecessary to move the craft to accurately establish its initial heading in a geographic or Earth's field magnetic coordinate system. With the craft stationary, its initial heading is accurately and rapidly determined with the use of the improved equipment by electrically transferring into the heading system of the craft the heading data of the directional gyro of the equipment as oriented in accordance with a known orientation.

An object of the present invention is to construct equipment of the character described where the directional gyro is capable of maintaining its accuracy while being transported from an orienting fixture of known azimuth position to a similar fixture that is fixed in predetermined relation to the longitudinal axis of the craft.

One of the features of the invention resides in the inclusion in a portable directional gyro and portable power supply combination of an integrator that is electrically connected to the azimuth pick-off of the gyro to establish an output for compensating the gyro for drift when the gyro is being oriented to its known azimuth position and that is electrically disconnected from the pick-off while maintaining its established output when the equipment is transported for use on the craft.

Another feature of the invention resides in the inclusion in the gyro component of a combination of the character described of individual orienting and drift compensating means where the orienting means is electrically connected to the azimuth pick-off of the gyro during the orientation of the gyro to the known azimuth position and where the orienting means is electrically disconnected from the pick-off when the equipment is transported for use on the craft.

Other objects, features and structural details of the invention will be apparent from the following description when read in relation to the accompanying drawings in which:

FIG. 1 is a detail perspective view of an angle fixture on which the portable directional gyro is temporarily mounted for orientation in a known azimuth direction, FIG. 2 is a detail perspective view of the gyroscopic component of the improved equipment, FIG. 3 is a detail perspective view of the portable receptacle providing the power package of the equipment, and FIG. 4 is a schematic view and wiring diagram showing the connections between the electrical power source and the electrical components of the directional gyro.

The alignment fixture shown in FIG. 1 consists of an angle fixture or aligning pad 10 that is permanently mounted on a rigid base or concrete pedestal at a convenient location in an airport or other locality at which the equipment is usable such as on the hangar deck of an aircraft carrier. Fixture 10 includes an alignment plate 11 with three adjustable studs 12 whose ends define a vertical plane that is perpendicular to a known azimuth position. The gyroscopic component of the equipment includes a directional gyro 14 whose housing 15 is connected by shock mounts 16 to a base 17 with a carrying handle 18 and a vertical mounting plate 19 with a bent pin 20. The gyro component 14 is mounted on the fixture 10 with the pin 20 engaging a notch 21 in the plate and with the flat plate 19 contacting the ends of the studs 12. When so mounted, the housing 15 of the directional gyro 14 is oriented to the known azimuth. A second alignment plate or pad of a character similar to plate 11 is fixedly located on the craft to which the data output of the directional gyro is to be transferred with the plate defining a vertical plane arranged in a predetermined relation to the longitudinal axis of the craft, to thereby define a further predetermined direction relative to said craft axis. The craft plate may be a permanent fixture that is located in a position where it is readily accessible from the ground.

A package 22 with a handle 24 provides a portable receptacle for the power supply and other electrical components of the equipment. It also includes a compartment 25 in which the gyroscopic component of the equipment may be carried during a transfer operation as well as a storage place therefor when not in use.

As shown in FIG. 4, the elements of the directional gyro component of the equipment include a ring 26 that is mounted in the housing 15 with freedom about a vertical axis 27. The azimuth output component of the gyro is provided by an electrical pick-off 28 having a rotor winding part 29 fixed to the ring 26 and a stator winding part 30 fixed to the housing 15. The gyro further includes a rotor 31 that spins about a normally horizontal axis 32 in a frame or case 34. As shown, the frame 34 is mounted on ring 26 with freedom about a second horizontal axis 35 perpendicular to the spin axis 32. The rotor 31 of the directional gyro is driven by a suitable electric motor whose windings are indicated at 36 in FIG. 4.

The receptacle 22 of the combination provides a portable power supply for the directional gyro and indicated as a D.C. source 37 in FIG. 4. The source 37 supplies input power to an inverter 38 by way of lead 39. The A.C. output of the inverter 38 provides the energy required to operate the pick-off 28, a torque motor 40 included in the means for orienting the gyro and the windings 36 of the rotor spinning motor. The source 37 is directly used to energize a torque motor 41 included in the means for compensating the gyro for drift as well as to supply power to the amplifiers of the equipment.

In the circuit means shown in FIGS. 2, 3 and 4, one of the included circuits connects the power supply inverter 38 to the pick-off 28 and the pick-off 28 to the orienting torque motor 40. As shown, the inverter 38 in receptacle 22 is electrically connected to the stator 30 of pick-off 28 in the housing 15 of the gyro 14 by way of lead 42 to a suitable terminal 43 on the panel board 44 of the receptacle, a connecting cable 45 with suitable end connectors, a suitable terminal 46 on the base 17 and lead 48. The circuitry provided between the movable or rotor part 29 of the pick-off 28 and torque motor 40 includes poly-circuit lead 49, demodulator 50, lead to terminal 46, cable 45 to terminal 43, lead 52, modulator 53, lead 54 to connecting lead 55, amplifier 56 to the blade 57 of a four position switch 58 whose respective positions are indicated as off, orient, integrate and free. The demodulator 50, modulator 53 serve as a quadrature rejector to improve system performance. The circuit to the motor 40 is closed through switch 58 in both the orienting and integrating modes of operation of the equipment by way of connecting leads 59, 60 to terminal 61 on the panel board 44, cable 62, terminal 63 on the base 17 of the gyro component, and lead 64 to the control field winding 65 of the torque motor 40. In the off condition of the equipment or in the free mode of operation, the circuit to the orienting motor 40 is opened by the blade 57 of switch 58. As shown in FIG. 4, the switch 58 is an electrical component of the receptacle 22 whose blade 57 is set by the adjustable knob 65 located on the panel board 44. A null indicator 66 located on the base 17 of the gyro component is connected to lead 51 of the described circuit by way of lead 67 and serves to indicate when slaving to the known predetermined reference direction is complete and integration may be initiated. In accordance with the present invention, the motor 40 is energized at a relatively high energy level in the orienting mode of operation of the equipment and is energized at relatively low energy level in the intergrating operational mode. This result is obtained in the improved equipment by a circuit between the inverter 38 and the fixed field winding 68 of motor 40 that includes a switch 69 whose blade as indicated at 70 is settable in positions corresponding to that of switch 58. In the orienting operational mode, the circuit includes lead 71, amplifier 72, lead 73, the blade 70 of switch 69 located in orient position, lead 74 to terminal 61, cable 62, terminal 63 and lead 75. In the integrate mode, the inverter 38 is connected to winding 68 in bypassing relation to the maplifier 72, with lead 71 being connected to lead 74 by way of lead 75' and the blade 70 in its integrate position.

The integrator or integrating means included in the improved combination as a part of the receptacle 22 is indicated at 76. As shown in FIG. 4, the means for compensating the gyro for drift includes the integrator 76, the torque motor 41 and a switch 77 whose blade 78 is settable in positions corresponding to those of the blades 57 and 70 of switches 58 and 69. In the integrate positon of the switch blade 78, the integrator 76 is connected to the pick-off 28 by of the output lead 54, blade 78, connecting lead 80, amplifier 81 and lead 82. The integrator 76 includes a motor 83 that is driven in accordance with the output of the amplifier 81. Shafting 84 of the motor 83 moves the rotor of a speed or tachometer generator 85 and the sliders 86 and 87 of rheostats 88, 89. The output of the generator 85 is connected in degenerative feedback relation to the motor 83 by an input lead 90 to the amplifier 81 thereby to accurately control the speed of shaft 84 in accordance with the input signal on lead 80 to the integrator 76. The rheostats 88, 89 are arranged in a bridge circuit whose respective branches include half the center tapped to gorund winding 91 of the torque motor or compensating motor 41. Winding 91 is fixed to the ring 26 and the output differential of the bridge is such as to cause the armature of the motor connected to the frame 34 to exert a torque about the axis 35 of the directional gyro. In the circuitry provided lead 92 connects one end of the winding 91 to slider 86, and lead 93 connects the other end of the winding 91 to the slider 87 by way o fthe terminals 63, 61 and the cable 62. The circuit is energized from source 37 by a lead 94 to the rheostat 88 and a lead 95 connecting lead 94 to the rheostat 89.

The windings of the orienting motor 40 are fixed to the ring 26 to control the armature connected to frame 34 and exert a torque about the axis 35 of the gyroscopic component of the equipment. Power is supplied from the inverter 38 to spin the rotor 31 by way of lead 71 and connecting lead 96 through terminals 63, 61 and cable 62 to the windings 36 of the spinning motor. Shafting 97 connects the control knob 65 to the setable blades of the respective switches 58, 69 and 77.

The equipment is set up for operation with the gyro component hung on the oriented angle fixture 10 and the nearby receptacle 22 connected thereto by the cables 45 and 62. With knob 65 turned from the off to the orient position of operation, the driving motor brings the rotor 31 quickly up to speed. The orienting torque motor 40 with its control field winding responsive to the output of the pick-off 28 by way of switch 58 and its fixed field winding energized at a relativel yhigh level by the output of amplifier 72 by way of switch 69 precesses the ring about axis 27 to an oriented condition with respect to the oriented gyro housing 15 where the only output of the pick-off is due to drift caused by the effect of the rotating Earth at the location of the fixture and by transmission line and unbalance error in the equipment. During the orientation mode of operation of the equipment, the component in the output of the pick-off 28 due to the error is measured as the output of the integrator 76 where motor 83 moves the sliders 86, 87 of the rheostats 88, 89 to unbalnace the bridge including the winding of the compensating motor 41. When the operation in this mode has resulted in the movement of the pointer of the indicator 66 to a null or zero condition, the pick-off 28 at the gyro component has been oriented in relation to the known orientation of the fixture 10 that is, the inertial reference provided by the gyro has been slaved to the predetermined reference direction. The operator then sets the knob 65 to its integrate position to initiate the integrating mode of operation of the equipment. Here, the amplifier 72 is cut-out by the switch 69 and the equipment functions automatically to maintain the oriented condition of the pick-off with whatever compensation that is required from the integrator 76 to correct for the noted errors. The equipment is left functioning in this mode until it is certain that the movement required of the sliders 86 and 87 has stopped along with the motor 83. With the directional gyro oriented to the known azimuth of the fixture 10, there is no output from the pick-off 28, the orienting motor 40 exerts no torque about the axis 35 of frame 34 and the compensating motor 41 exerts a continuous torque about the axis 35 of the frame 34 that is equal and opposite to the cumulative errors that would cause the ring 26 to drift about its vertical axis. In the improved equipment, the need for observing the drift over a number of successive periods for averaging purposes and of setting in the equipment an approximation in accordance with the observation is avoided.

At the completion of the integrating operational mode, the knob 65 is set in the FREE position and cable 45 is disconnected from both the gyro base terminal 46 and the receptacle terminal 43. In this mode, power is still provided from the source 37 for the operation of the compensating motor 41 in accordance with the output of the integrator 76 through cable 62. Power for the rotor spinning motor from the inverter is also supplied through the cable 62. In the free position of the switches 58, 69 and 77, the field windings of the motor 40 are disconnected from the inverter 38 and the integrator 76 is disconnected from the pick-off 28. The portable directional gyro 14 and receptacle 22 are now transported by hand or by suitable conveyance to the craft where the directional gyro is hung on a fixture similar to the fixture or aligning pad 10 that is fixedly oriented with respect to the longitudinal axis of the craft. After a suitable warm-up period of the compatible heading system in the craft, a connecting cable is plugged into the terminal 46 in the base 17 of the directional gyro 14 and the pick-off 28 provides an initial aligning output to the craft system that obviates the need of orienting the craft to obtain the same results. At the completion of the alignment, which is indicated by a null reading on annunciator 66 the directional gyro is removed from the craft fitting, connected from the craft cable and returned to storage in the compartment 25 of the receptacle 22 ready for further use.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. Apparatus for use in initially aligning the direction defined by a navigation reference system of a navigable craft in accordance with a predetermined reference direction comprising,
   (a) a first aligning pad remote from said craft for defining said predetermined reference direction,
   (b) a second aligning pad fixedly mounted on said craft for defining a further direction relative to an axis of said craft,
   (c) a gyroscope device having means for defining an inertial reference direction and having a reference surface adapted for detachable mounting on said aligning pads,
   (d) means adapted for operation when said gyroscopic device is mounted on said first aligning pad for slaving said inertial reference direction defining means to the reference direction defined by said first pad,
   (e) integrating means having an input responsive to any long term deviation between said first reference direction and said inertial direction and providing an output for precessing said gyroscopic device in a direction equal and opposite to said deviation whereby said inertial direction is maintained substantially coincident with said predetermined reference direction,
   (f) means for severing the input to said integrating means and for maintaining the precession of said gyroscopic device in accordance with the output thereof, and
   (g) means adapted for operation when said gyroscopic device is mounted on said second pad for providing a slaving reference for said craft navigation reference system proportional to the angle between the direction defined by said inertial direction defining means and the further reference direction defined by said second pad whereby the direction defined by said craft navigation system may be aligned with said predetermined reference direction regardless of the direction of said craft axis relative to said predetermined reference direction.

2. Apparatus as set forth in claim 1 wherein said means operable when said gyroscopic device is mounted on said first pad includes selectable means for producing an initially high slaving rate, for thereafter providing a relatively low slaving rate and for simultaneously coupling said input with said integrator means.

3. Apparatus as set forth in claim 1 wherein said gyroscopic device is a directional gyro including a gimbal pivotally mounted in a housing for movement about a vertical axis, a frame with a rotor adapted to spin about a normally horizontal axis and pivotally mounted on said gimbal with freedom about a second horizontal axis perpendicular to said rotor spin axis, a pick-off having a part fixed on said housing and a part movable with said vertical ring, said spin axis defining said inertial direction and said pick-off defining a null position relative to the reference surface of said device when said spin axis bears a predetermined relation to said reference surface and providing a signal proportional to angular deviations from said null position.

References Cited by the Examiner
UNITED STATES PATENTS

| 2,811,785 | 11/1957 | Braddon et al. | 33—204 |
| 2,855,558 | 10/1958 | Fragola | 33—222 X |
| 2,887,783 | 5/1959 | Blizard | 33—204 X |

FOREIGN PATENTS

| 1,315,998 | 12/1962 | France. |
| 1,318,726 | 1/1963 | France. |
| 956,264 | 4/1964 | Great Britain. |

ROBERT B. HULL, *Primary Examiner.*